UNITED STATES PATENT OFFICE.

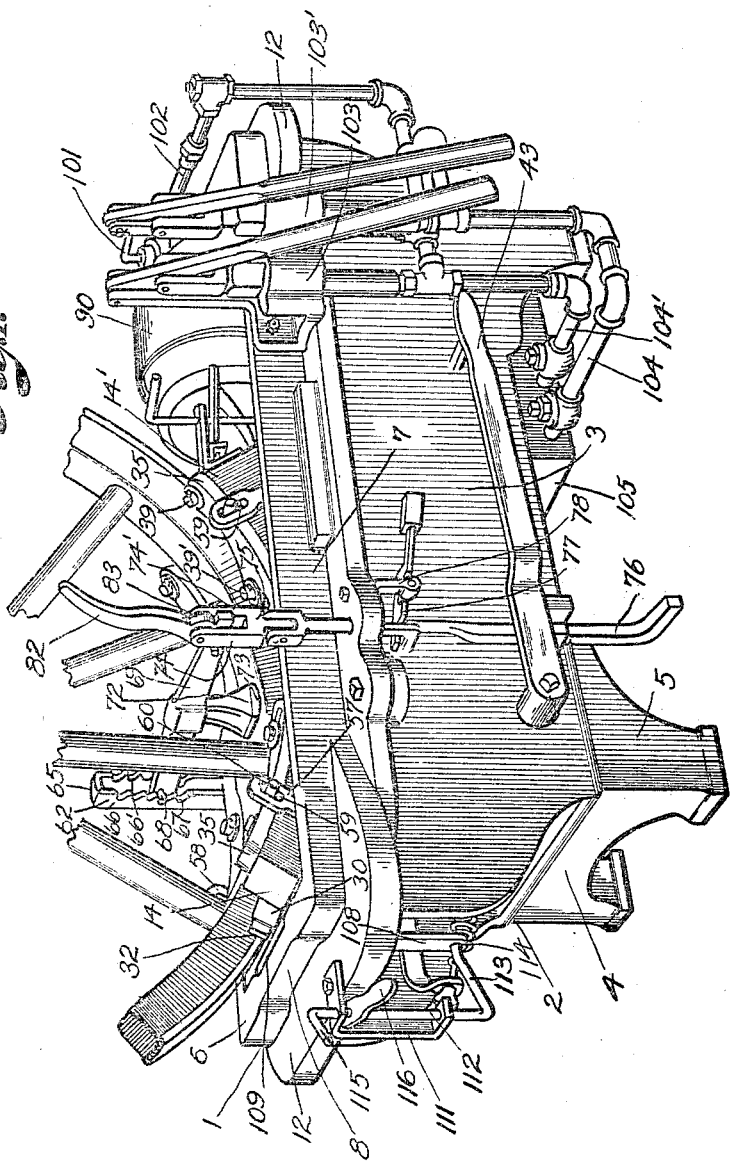

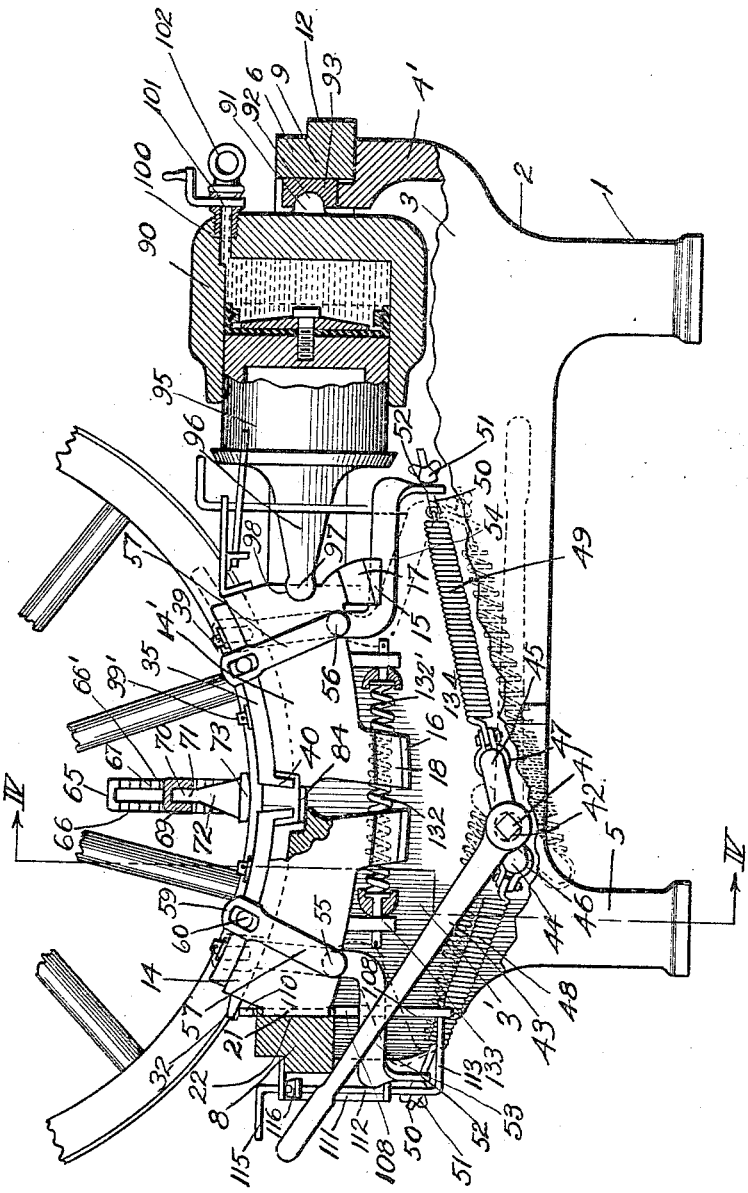

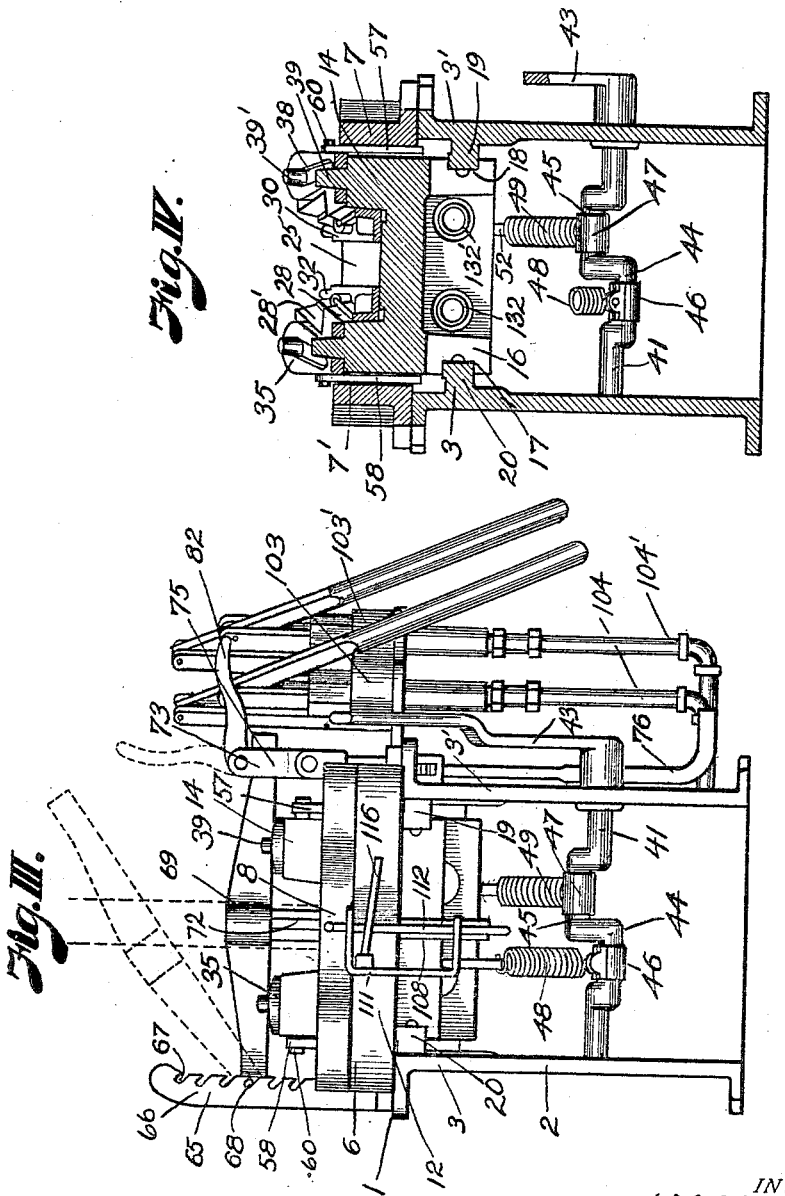

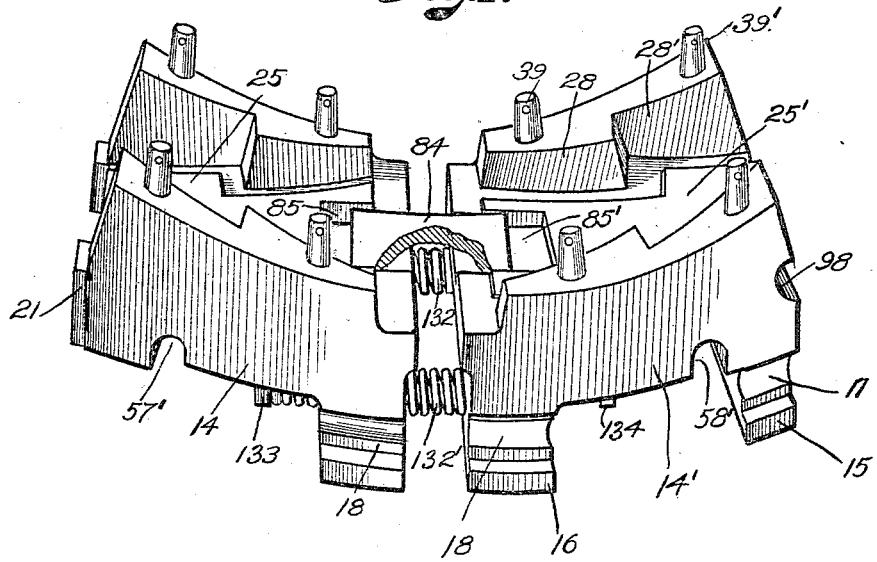
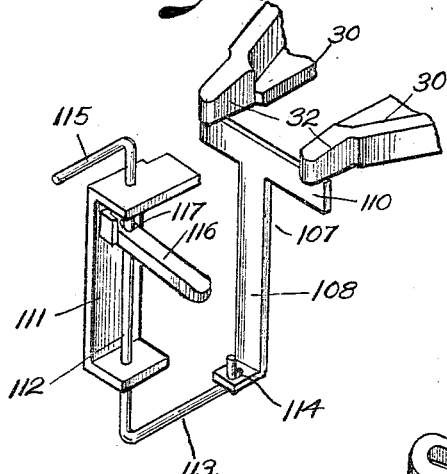
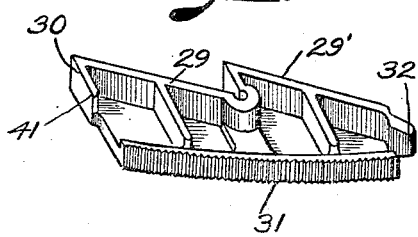
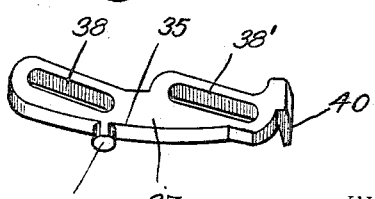

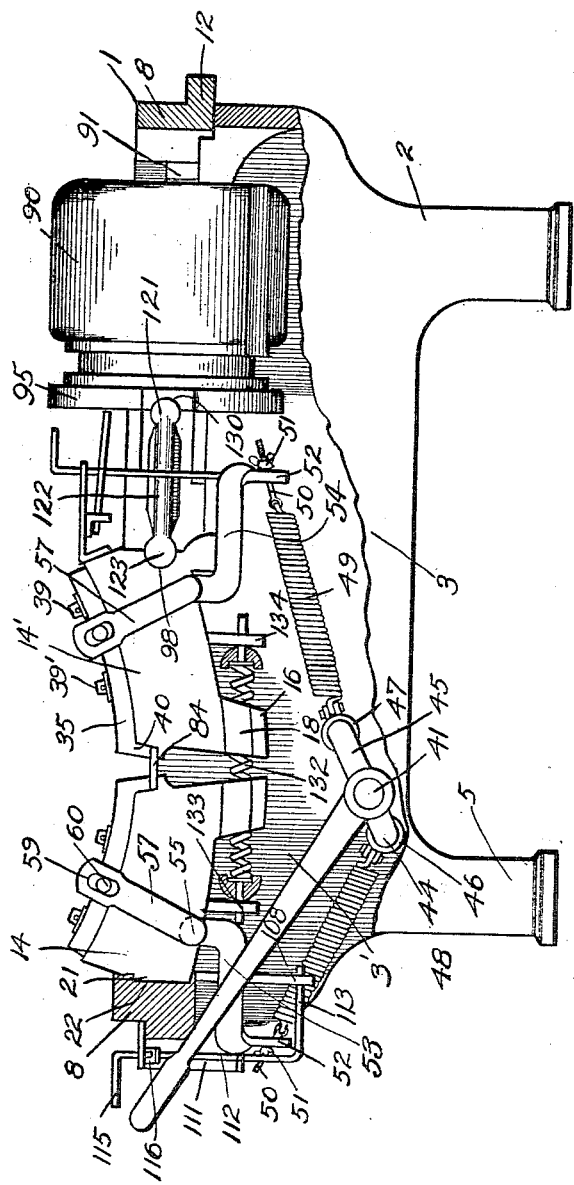

ISAAC M. HACKNEY, OF WICHITA, KANSAS.

TIRE-SETTER.

1,276,755.  Specification of Letters Patent.  Patented Aug. 27, 1918.

Application filed December 15, 1916. Serial No. 137,190.

*To all whom it may concern:*

Be it known that I, ISAAC M. HACKNEY, a citizen of the United States, residing at Wichita, in the county of Sedgwick and State of Kansas, have invented certain new and useful Improvements in Tire-Setters; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to tire setting devices and more particularly to devices of this character known as cold tire setters; the principal object of the invention being to provide a device whereby a tire may be tightened on a wheel felly by upsetting the same without first removing or heating the tire and without flattening or straightening the tire at the upsetting point.

A further object of the invention is to provide means for quickly adapting the machine to tires of different width or diameters.

In accomplishing these objects, I have provided improved details of structure, the preferred forms of which are hereinafter described and illustrated in the accompanying drawings, wherein:—

Figure I is a perspective view of a preferred form of tire setting device, constructed according to my invention.

Fig. II is a side view of the same, partly in section, showing the movable draw heads and pivotally mounted pressure cylinder.

Fig. III is an end view of the device.

Fig. IV is a vertical cross section on the line IV—IV, Fig. II.

Fig. V is a detail perspective view of the draw heads.

Fig. VI is a detail perspective view of the grip-key lifting mechanism.

Fig. VII is a detail perspective view of one of the grip keys.

Fig. VIII is a detail perspective view of one of the key slides.

Fig. IX is a side view partly in section of a modified form of tire setting device wherein the compressing cylinder is stationary.

Referring more in detail to the drawings:—

1 designates a tire setting device constructed according to my invention, comprising a body frame 2 having side walls 3—3', ends 4—4' and legs 5 whereby the body may be supported at a convenient height above a working base.

Seated on the body frame 2 is a top frame 6 comprising side rails 7—7' and end bars 8—9, which are substantially strengthened by flanges 12 to enable the frame to effectively resist the pressure to which it is subjected during a setting operation.

Mounted at one end of the body frame, between the side members 3—3' and between the rails 7—7' of the top frame 6, are draw heads 14—14', which support the wheels during a setting operation, and which comprise mechanism presently described for gripping the tire on opposite sides of the upsetting point, so that by an inward movement of the draw heads the tire is upset and shortened and thus tightened on the wheel.

The draw heads are provided on their under faces and near their ends with downwardly extending bosses 15—16, having outwardly opening slots 17—18 therein adapted for seating over radially curved rails 19—20 on the body side frames 3—3', so that the draw heads are supported thereon.

The draw head 14, hereinafter referred to as the stationary or fixed head, is provided at its outer end with spaced bosses 21, which seat in sockets 22 in the cross bar 8 of the top frame 6 and is prevented from moving outwardly thereby. The head 14' which will be referred to as the movable head, is slidably mounted on the rails 19, 20 and is adapted to move toward and from the stationary head.

Each of the draw heads is provided in its upper face with a socket 25, the base of which is curved radially from a point common to both heads to seat the rims of a wheel of average diameter, and the opposite side walls of the sockets are offset to form double angle seats 28—28', against which the bases 29—29' of grip keys 30 are seated; the keys are also curved to seat in the head sockets and have serrated gripping edges 31 for engaging opposite sides of a wheel tire and have end portions 32 extended beyond the ends of the heads, whereby the keys are adjusted to tires of different diameters, as will presently be described.

After a wheel has been seated within the sockets of the draw heads and before the setting operation it is necessary to tighten the grip keys against the tire; this is accomplished by shift keys 35 each comprising a plate 37 having slots 38—38' through which pins 39—39' on the draw heads are projected so that the keys may have a forward and rearward slidable movement thereon.

Each of the shift keys has a downwardly and inwardly turned end flange 40 which is adapted for engaging an end 41 of a corresponding grip key so that by moving the key shifts outwardly along the draw heads the key grips are also moved outwardly within their sockets and the faces 29—29' will ride up the angular faces 28—28' of the head sockets to cause the key to be moved inwardly and tightened against the wheel tire.

The shifting of the key slides to tighten the grip keys is accomplished by a lever mechanism comprising a main shaft 41 which is revolubly carried beneath the draw heads by the body side frames 3—3' and has a squared end 42 extending beyond the body for carrying an operating lever 43.

The portion of the shaft within the body is provided with oppositely extending crank portions 44—45 having collars 46—47 thereon to which tension springs 48—49 are attached; the outer ends of the springs carrying eye bolts 50 and tightening wing nuts 51 by which they are adjustably attached to the downturned ends 52 of arms 53—54 carried by rocker shafts 55—56, which are revolubly seated in transverse slots 57'—58' on the under sides of the draw heads and are retained therein by the upper faces of the rails 19—20.

Each of the rocker shafts is provided at its ends with upstanding arms 57—58 having end slots 59 therein for receiving pins 60 which project laterally from each of the key slides, so that by rocking the lever 43 the crank shaft 41 is rocked to tension the springs 48, 49 to draw downwardly on the arms 53—54 to rock the shafts 55—56 to cause an outward movement of the slotted arms 57 and a like movement of the key slides to tigthen the grip keys against the wheel tire.

I also provide means for retaining the wheel in a seated position during the setting operation and to prevent jumping or slipping, comprising a bracket 65 having spaced side members 66—66' provided with downwardly opening sockets 67 adapted for seating the end pin 68 of a cross arm 69; the arm having a central bearing socket 70 for seating the ball end 71, of a felly-clamp 72 having a rocker head 73 for seating on the wheel felly.

The outer end of the cross arm extends slightly beyond the face of the base and between the arms 74—74', of a link 75 which is pivotally carried at the upper end of a foot lever 76, which is slidably projected through a side flange 12 of the base and is held against upward movement by a latch arm 77 pivotally carried by a bracket 78 on the base flange 12.

After tightening the cross arm against the wheel felly by the foot lever, additional tightening may be accomplished by a lever 82 carried between the link arms 74—74' having a cam head 83 which engages the arm and which by a downward movement of the lever will cause a like movement of the cross arm.

The support of the tire between the draw heads and to prevent it buckling outwardly while being upset, I provide a plate 84 which seats in sockets 85—85' in the head socket bases 25—25' and curve the plate similar to the curve of the drawheads, so that the wheel is not displaced from the draw head seats thereby.

After the wheel has been seated within the head block sockets and clamped therein by the cross arm and foot lever mechanism, and the grip keys tightened against opposite edges of the tire, the heads are moved together to cause an upsetting of the tire between the heads, and to accomplish the closing together of the draw heads, I provide a cylinder 90 having bearing bosses 91 at its outer end which pivotally seat in a socket 92 in a cross block 93, which is supported by the base end and against the top frame end bar 9.

Slidably carried within the cylinder is a piston 95, having an arm 96 extending forwardly and provided with a rounded end 97 for pivotally seating in a transverse socket 98 in the outer end of the movable head 14', so that by an outward movement of the piston within the cylinder the head 14' is moved in a radial line along the ribs 19—20 toward the stationary head and the cylinder pivots on its supports to compensate for the radial movement of the head.

The movement of the piston within the cylinder is accomplished by a fluid pressure medium which is admitted to the cylinder through an opening 100, which I prefer to place at the upper movement of the cylinder and which is controlled by a valve 101 having pipe connection 102 with the pumps 103—103', connected by pipes 104—104' with a tank 105, whereby the fluid may be pumped from the tank and compressed within the cylinder to actuate the piston.

After an upsetting operation has been effected, the lever 43 is moved to turn the shaft 41 and release the spring tension on the rocker shafts, thereby allowing the key shifts to be restored to normal position. The valve 102 is then opened to allow the compressing fluid to escape from the cylinder and to allow the draw heads to be restored to their open position; this movement of the latter being accomplished by compression springs 132—132' which bear against lugs 133 on the under face of the head 14 and against lugs 134 on the movable head 14' to move the head outwardly along the rails 19—20, this movement causing an inward movement of the piston within the cylinder to displace the fluid therein.

It is apparent that where tires of different diameters are to be set it is necessary that the grip keys be adjusted to correspond to the radius of the tire, so that an extended gripping surface may be had. This key lifting or setting mechanism comprises a T-shaped member 107 having its stem 108 slidably extending downwardly in a socket 109 in the cross end 8 of the frame and has a cross arm 110 at its upper end which seats beneath the end projections 32 of the grip keys. Slidably carried in a bracket 111 secured to the frame is a lift lever 112, having an arm 113 at its lower end which projects into an aperture 114 in the end of the lift arm 108 and handle 115 at its upper end, whereby the lift may be raised so that the cross arm 110 engages the outer ends of the grip keys and raises the same to correspond to the curvature of the tire. Both sets of grip keys are similarly adjusted and the parts are identical except that the bracket for the set of the movable head grips is fastened to the end of the head instead of the body frame. Both sets of keys are held in adjusted position by a latch 116 which is pivotally supported by the bracket 111 at one end and has an aperture 117 through which the lift bars 115 are projected; the aperture being slightly greater in diameter than the rod so that when in a downwardly inclined position a grip may be effected and which may be released by raising upwardly on the free end of the latch to allow the rod to slide freely in the aperture.

In Fig. IX I have shown a modified form of machine which is identical with the preferred form in all parts except the cylinder and draw head connecting parts.

In the modified form the cylinder 90 is fixed between the side frames and the piston head is provided with a socket 130 with which the rounded end 121 of a link 122 is pivotally seated; the opposite end of the link having a rounded end 123 which seats on the draw head socket 98.

By this connection a radial movement may be attained by the draw head and the ram link slidably anchored in the body frame.

Assuming the machine to be so constructed, with the parts in open position, and it is desired to set a wheel tire, the wheel is placed on the draw heads as shown in Fig. I, the clamp lever 70 is adjusted in the bracket 65 and tightened against the wheel felly by the foot lever 76 and hand lever 82.

The grip keys are then set in proper position to grip the tire by adjustment of the key lifts 112 and are tightened against the tire by the operation of the lever 43 to rotate the shaft 41 and through the springs 48—49 move the rocker arms 53—54 and shafts 55—56 to move the key slides and grip keys to functional position.

After the parts have thus been set, the valve 101 is opened and a pressure fluid pumped from the tank 105 into the cylinder to move the piston outwardly and cause a radial movement of the draw head 14' toward the head 14, and as the tire is gripped by the heads that portion between the heads is upset and shortened and the tire tightened about the wheel.

After the heads have reached the closed position, pressure is released from the cylinder by manipulation of the by-pass valve 101, so that the fluid may escape therefrom and the parts are moved to initial position by the outward pressure of the spring 102.

The felly clamp is then released by raising the end of the latch lever 77 and lever 82 so that the link 75 may be released from the arm 69 and the latter removed to free the wheel from the draw heads.

In this instance I have shown two pressure pumps 103—103', but wish to state that it is necessary to provide but one, as the pump 103' is designed as a high pressure pump and is used to supplement the pump 103 when greater pressure is required to upset a tire.

It is also apparent that any desirable pump could be used, either a hand power pump or one operated by machine power.

With a tire setting device so constructed it is apparent that a tire may be set while on the wheel and without heat being applied thereto.

It is also apparent that the abrupt double angle of the gripping key bases diminishes the side pressure on the tire and prevents cupping the tire transversely, and that by providing several sets of grip keys, of different widths, tires of different widths and thickness may be upset.

It will also be seen that the grip keys may easily and quickly be adjusted to grip the edges of tires of different diameters.

Having thus described my invention what I claim as new therein and desire to secure by Letters-Patent, is:—

1. A tire setting machine comprising a supporting frame having arcuate rails thereon, a fixed gripping head, a movable gripping head slidably carried on said rails, and having radial movement toward and away from the fixed head, a pivotally supported cylinder, a piston in said cylinder having connection with the movable gripping head, and means for returning the piston to initial position.

2. A tire setting machine comprising a supporting frame having side and end members, arcuate rails oppositely located on said side members, a draw head supported between said side frames and against an end member, a movable draw head slidably carried on said rails having arcuate movement toward and from the fixed head, devices on said heads for gripping opposite edges of the wheel tire, a cylinder pivotally mounted between said frame members, a piston in said cylinder having pivotal connection with the movable draw head, means for actuating the gripping devices, and spring mechanism for returning said piston to initial position.

3. In a tire setting device, a frame having an arcuate guide, a draw head fixed on said frame, a draw head movable along said guide, the movable head and an adjacent portion of the frame being provided with spaced sockets, a cylinder having a boss pivotally mounted in the frame socket, a piston coöperative with the cylinder and having a boss pivotally mounted in the movable draw head socket, and means for controlling flow of fluid pressure medium to and from the cylinder, whereby movement of the movable draw head is effected for the purpose set forth.

4. In combination with a frame, paired draw heads mounted in said frame, each provided with a tire channel, a pair of gripping keys adjustably mounted in each of said channels and shifting devices for each pair of gripping keys comprising revoluble cross shafts, rocker arms extended upwardly from said shafts and slidably connected with said gripping keys, an actuating rocker arm for each shaft, a common actuating lever and yielding means connecting said actuating member with both of the shaft actuating rocker arms, whereby simultaneous actuation of the gripping keys is effected.

5. In a tire setting device, a pair of draw heads each having an upwardly facing channel for seating a wheel rim and tire and having double inclined side walls, pins projecting from said heads at opposite sides of said channel, tire gripping keys slidably mounted in said channels, having serrated gripping edges adapted for engaging a wheel tire and having double inclined rails at their opposite sides for seating against inclined channel walls, key shifting devices slidably mounted on said heads, having slots therein for receiving said pins at opposite sides of said channel and having downturned ends for engaging the gripping keys, shafts revolubly mounted beneath said draw heads, having rocker arms thereon for actuating the key shifting devices, and means for actuating the rocker shafts, for the purpose set forth.

6. In a tire setting machaine comprising a pair of draw heads, having concentrically-curved, channeled faces for receiving a wheel rim and tire, the channels in said faces having double inclined side walls, tire gripping keys seated in said channels and having inclined side rails adapted for seating against said inclined channel walls, and having gripping edges for engaging a wheel tire, pins projecting upwardly from said heads, at opposite sides of said channels, key shifting devices slidably mounted on said heads at opposite sides of said wheel, having downturned portions for engaging said gripping keys and having inclined slots therein for receiving said pins, a shaft revolubly mounted beneath each of said draw heads, a pair of rocker arms on each of said shafts having pivotal connection with the key shifting devices, an arm on each of said shafts, an intermediate crank shaft, springs connecting each of the last named arms with a crank portion of said shaft, and means for rocking the crank shaft, for the purpose set forth.

7. In a tire setting device, a frame, draw heads mounted in said frame and provided with tire receiving channels, gripping devices disposed longitudinally within the said channels for engaging opposite edges of a wheel tire, and means carried by the frame for adjustably supporting the said gripping devices to engage tires of different radii.

8. In a tire setting device, a frame, draw heads mounted in said frame and provided with tire receiving channels, gripping devices disposed longitudinally within the said channels for engaging opposite edges of a wheel tire, and adjustable within said channels longitudinally and vertically at their outer ends, a member slidably mounted on said frame and adapted for engaging the vertically movable ends of its paired gripping devices to effect adjustment thereof and means for locking said member at an adjusted position.

9. In a tire setting device, a frame, draw heads mounted in said frame and provided with tire receiving channels, gripping devices mounted in said channels adapted for engaging opposite sides of a wheel tire and adjustable both longitudinally and, at their outer ends vertically, within said channels, slide members on each head engaging said gripping devices to adjust the same against a tire, movable members mounted on said frame for engaging the vertically adjustable ends of said paired gripping devices, means for locking said members at an adjusted position and means for actuating the slide devices and for locking the same to retain the gripping devices in gripping relation with a tire.

10. In a tire setting machine, the combination with a frame having draw heads therein, comprising radially curved channels for seating a wheel tire and rim, and having tire gripping devices seated within said channels and engaging the channel walls and the edges of the tire, and having end portions extending beyond the draw heads, a key lifting device comprising a cross bar seated beneath said extended end portions, a lift bar supporting said cross bar, slidably mounted in said frame and having an aperture at its lower end, a bracket carried by the frame, a lift rod carried by said bracket having an inturned portion at its lower end projected into said lift bar aperture, and an outturned handle portion at its upper end, and a supporting member, comprising a bar, pivotally supported at one end in said bracket and having an aperture for receiving the lift rod to form a clutch.

11. In a tire setting machine, comprising draw heads having radially curved upper faces for seating a wheel thereon, and having gripping devices on said heads for gripping a wheel tire, a clamping device, comprising a standard having downwardly opening notches at its edges, a cross bar, a pin projected through one end of said bar and adapted to seat in a pair of said notches, a foot lever slidably carried by said frame at the side opposite the standard, a yoke pivoted at the upper end of said lever for receiving the end of said cross bar, a rocker pivotally seated against said cross bar and against the wheel felly, and means for locking the said cross bar and rocker in clamping position.

12. In a tire setting machine, a frame comprising side members having arcuate ribs thereon, draw heads slidably carried by said ribs, having concentrically curved seats for receiving a wheel thereon, gripping devices for gripping opposite faces of a wheel tire, a notched standard secured to said frame at the side of the wheel, a cross arm having a pin projecting through one end for seating in said standard notches, a foot lever slidably carried by the frame having a pivoted yoke link at its upper end for receiving the end of the cross arm, a rocker pivotally carried by said arm adapted for seating against the wheel felly, a tightening lever carried by the yoke link, having a cam face for engaging the arm to tighten the rocker against the wheel felly, and a clutch for locking the foot lever in set position.

ISAAC M. HACKNEY.

Copies of this patent may be obtained for five cents each, by addressing the "Commissioner of Patents, Washington, D. C."